US006700742B2

(12) United States Patent
Tsuyuki et al.

(10) Patent No.: US 6,700,742 B2
(45) Date of Patent: Mar. 2, 2004

(54) MAGNETIC TAPE CARTRIDGE

(75) Inventors: Seiji Tsuyuki, Kanagawa-ken (JP); Hideaki Shiga, Kanagawa-ken (JP); Daisuke Takahashi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/043,092

(22) Filed: Jan. 14, 2002

(65) Prior Publication Data

US 2002/0093764 A1 Jul. 18, 2002

(30) Foreign Application Priority Data

Jan. 18, 2001 (JP) ....................................... 2001-009672

(51) Int. Cl.$^{7}$ .......................... G11B 5/78; G11B 23/037

(52) U.S. Cl. ..................................... 360/134; 242/338.1

(58) Field of Search ................................ 360/132, 134; 242/338.1, 348, 338.2, 340, 349, 355, 355.1

(56) References Cited

U.S. PATENT DOCUMENTS

| | | | | |
|---|---|---|---|---|
| 5,027,249 A | * | 6/1991 | Johnson et al. | 242/345.2 |
| 5,881,960 A | * | 3/1999 | Christie | 242/342 |
| 5,893,527 A | * | 4/1999 | Mizutani et al. | 242/338.1 |
| 5,901,916 A | * | 5/1999 | McAllister et al. | 242/348 |
| 6,034,850 A | * | 3/2000 | Del Genio et al. | 242/338.1 |
| 6,038,112 A | * | 3/2000 | Kletzl | 360/132 |
| 6,113,020 A | * | 9/2000 | Nayak | 242/348 |
| 6,315,230 B1 | * | 11/2001 | Hansen et al. | 242/348 |
| 6,452,747 B1 | * | 9/2002 | Johnson et al. | 360/132 |

FOREIGN PATENT DOCUMENTS

| | | |
|---|---|---|
| JP | 11-238352 | 8/1999 |

* cited by examiner

*Primary Examiner*—Carl Whitehead, Jr.
*Assistant Examiner*—Jennifer M. Dolan
(74) *Attorney, Agent, or Firm*—Sughrue Mion, PLLC

(57) ABSTRACT

Disclosed herein is a magnetic tape cartridge including a cartridge case in which a single reel with magnetic tape wound on an outer periphery of a reel drum is rotatably housed. The magnetic tape cartridge further includes a locking member, provided within the reel drum so that it is movable between a locking position and an unlocking position in the axial direction of the reel. The locking member is used for locking the reel to restrain rotation of the reel during periods of non-use. In the magnetic tape cartridge, a first radial clearance between the locking member and the reel drum is set smaller than a second radial clearance between the reel and the cartridge case so that when the magnetic tape cartridge is vertically loaded into a cartridge drive unit, chucking failure is prevented.

11 Claims, 13 Drawing Sheets

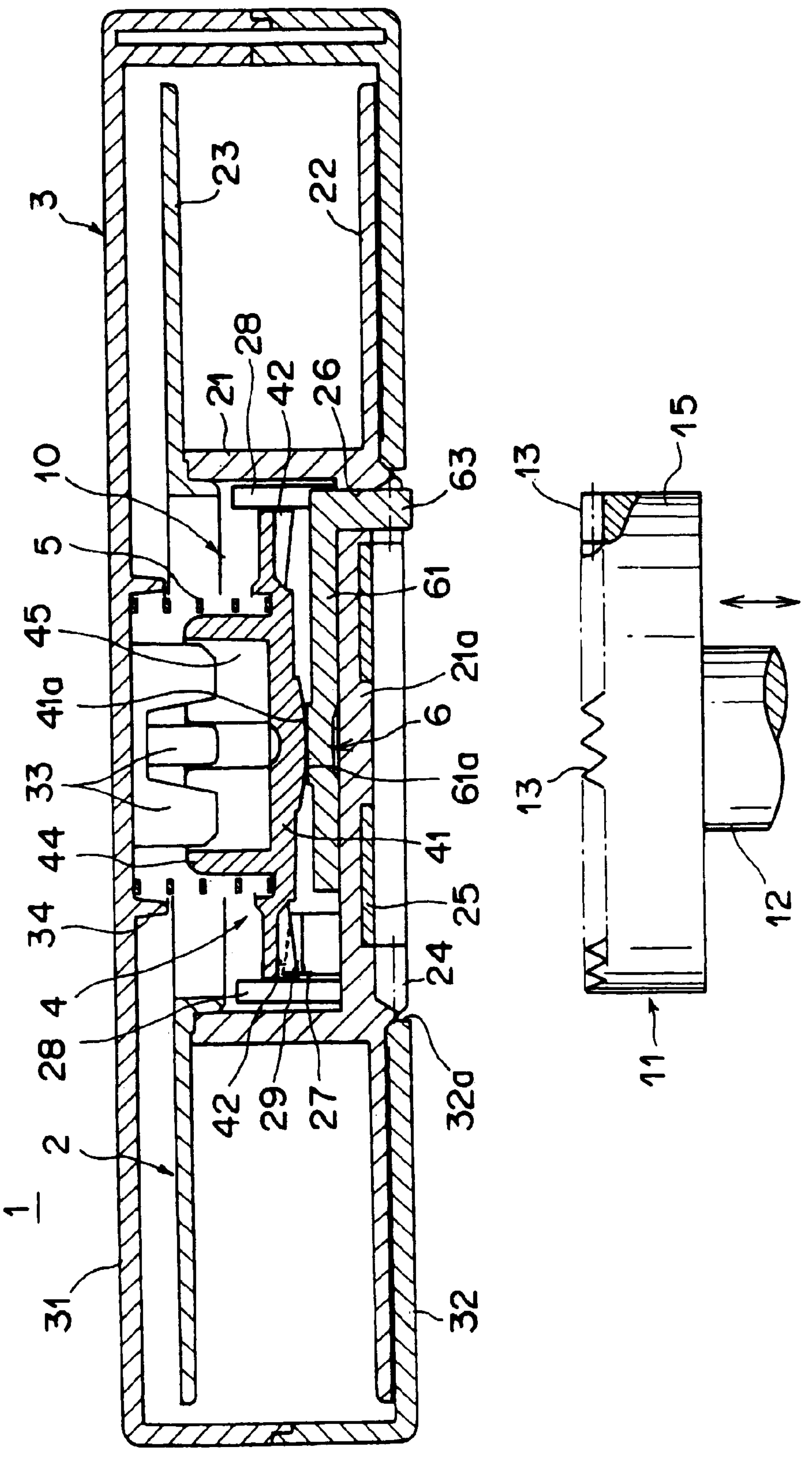
F I G . 1

F I G. 11
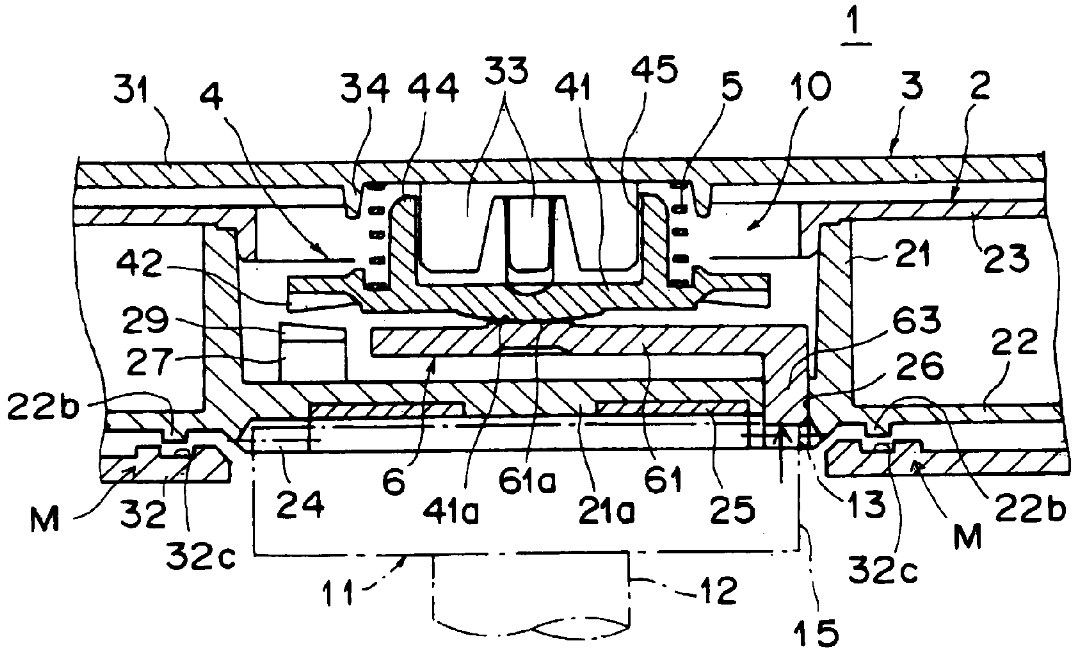

F I G. 14
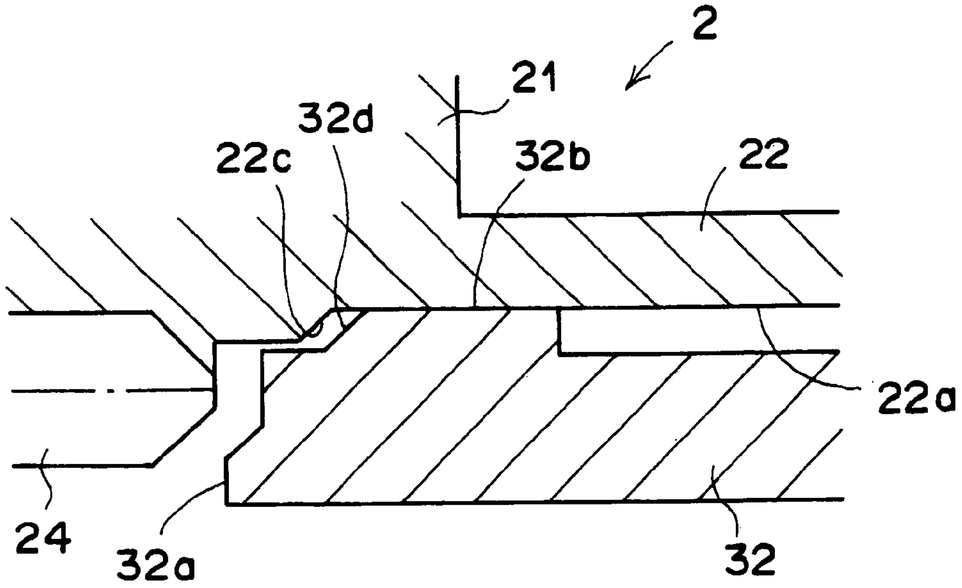
F I G. 15
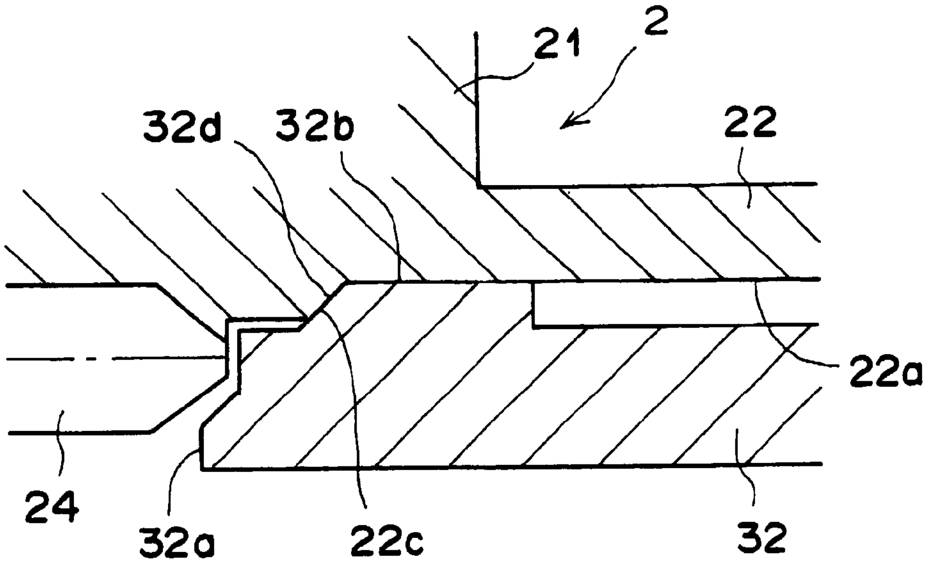

MAGNETIC TAPE CARTRIDGE

BACKGROUND OF THE INVENTION

1. Field of the Invention

The present invention relates to a magnetic tape cartridge, and more particularly to a magnetic tape cartridge where a single reel with magnetic tape wound on the outer periphery of a reel drum is rotatably housed within a cartridge case.

2. Description of the Related Art

In magnetic tape cartridges, which are being used as storage media that are employed in external storage units for computers, etc., there is known a type where a single reel with magnetic tape wound thereon is rotatably housed within a cartridge case.

This type of magnetic tape cartridge has only a single reel within the cartridge case. Because of this, when the magnetic tape is loosened by shock due to the cartridge falliing, etc., the loose part cannot be absorbed and therefore there is a disadvantage that the magnetic tape will be damaged.

Hence, a magnetic tape cartridge equipped with a reel locking mechanism which restrains rotation of the reel during periods of non-use has been provided. The reel locking mechanism is disclosed, for example, in Japanese Unexamined Patent Publication No. 11 (1999)-238352. The reel locking mechanism is equipped with a locking member movable toward and away from the reel to restrain rotation of the reel, an urging member (e.g., a coil spring) for urging the locking member in a locking direction, and an unlocking member which rotates integrally with the reel to move the locking member in an unlocking direction in accordance with the chucking operation of the rotation-drive means of a cartridge drive unit.

The locking member is equipped with a locking tooth portion, which meshes with a locking tooth portion formed in the reel to forcibly lock rotation of the reel during non-use. That is, the locking member is constructed so that the magnetic tape is not tightened or loosened by shock due to the cartridge falling, etc.

The bottom surface of the cartridge case has a circular opening, which is exposed to the outside so that the bottom surface of the reel drum can be chucked by the rotation-drive means of the cartridge drive unit. The circumference of the opening is formed into a receiving surface that receives the reel during non-use. During non-use, the urging force of the urging member for urging the locking member in a locking direction is exerted on the reel through the unlocking member, whereby the reel is pressed against the receiving surface of the cartridge case.

This type of magnetic tape cartridge, incidentally, is often loaded into the cartridge drive unit in a posture where the axis of the reel drum becomes vertical. However, in the case of an automatic loader being equipped with a great number of cartridges, for example, each cartridge is loaded into the cartridge drive unit in a state where the axis of the reel drum is horizontal. That is, the cartridges are vertically placed.

In that case, since there is a radial clearance of some magnitude between the cartridge case and the reel, the vertically placed reel will be moved downward by the amount of the radial clearance, notwithstanding the fact that the reel is pressed against the receiving surface of the cartridge case by the urging force of the urging member.

On the other hand, the cartridge case is positioned by the positing means of the cartridge drive unit, and the rotation-drive member of the cartridge drive unit performs a chucking operation with the position of the cartridge case as its reference. Because of this, if the reel is moved downward when it is vertically placed, the center axis of the reel drum will be shifted from that of the rotation-drive member of the cartridge drive unit. Consequently, there is a problem that chucking failure of the rotation-drive member with respect to the reel drum will occur.

SUMMARY OF THE INVENTION

The present invention has been made in view of the aforementioned circumstances. Accordingly, it is the primary object of the present invention to provide a magnetic tape cartridge which is capable of preventing chucking failure when it is vertically loaded into a cartridge drive unit.

To achieve this end and in accordance with the present invention, there is provided a first magnetic tape cartridge comprising:

a cartridge case in which a single reel with magnetic tape wound on an outer periphery of a reel drum is rotatably housed; and a locking member, provided within the reel drum so that it is movable between a locking position and an unlocking position in an axial direction of the reel, for locking the reel to restrain rotation of the reel during non-use;

wherein a first radial clearance between the locking member and the reel drum is set smaller than a second radial clearance between the reel and the cartridge case.

In the case where the reel drum has reinforcement ribs on the inner peripheral surface thereof, the aforementioned first radial clearance is the clearance between the outer peripheral surface of the locking member and the outer ends of the ribs. In the case where the cartridge case is equipped with a circular arc rib along the outer periphery of the reel, the aforementioned second radial clearance is the clearance between the outer periphery of the reel and the inner peripheral surface of the circular arc rib.

According to the first magnetic tape cartridge of the present invention, the first radial clearance between the locking member and the reel drum is made narrower than the second radial clearance between the reel and the cartridge case. Therefore, even if the reel is caused to move downward by the weight of magnetic tape when the magnetic tape cartridge is vertically loaded into the cartridge drive unit, the inside of the reel drum immediately abuts the outer periphery of the locking member and regulates downward movement of the reel. As a result, the amount of the core axis misalignment of the reel drum with respect to the rotation-drive member of the cartridge drive unit is held down to a slight value. Thus, chucking failure due to core axis misalignment is prevented.

In accordance with the present invention, there is provided a second magnetic tape cartridge comprising:

a cartridge case in which a single reel with magnetic tape wound on an outer periphery of a reel drum is rotatably housed;

a circular opening formed in a bottom surface of the cartridge case so that a bottom surface of the reel drum can be chucked by rotation-drive means of a cartridge drive unit; and a receiving surface, formed in the circumference of the opening, against which the reel is pressed in an axial direction of the reel with urging means during non-use;

wherein the receiving surface is enlarged in a radial direction of the reel.

In the second magnetic tape cartridge, a layer of material having great contacting and sliding resistances, such as a rubber type material, may be provided on the receiving surface by attachment of a sheet or a dichroic injection molding method.

According to the second magnetic tape cartridge of the present invention, the sliding resistance between the receiving surface and the reel is increased by enlargement of the receiving surface. Therefore, even when the magnetic tape cartridge is vertically loaded into a cartridge drive unit, the reel can be prevented from being moved by the weight of magnetic tape and it becomes possible to prevent chucking failure due to core axis misalignment.

In addition, since enlargement of the receiving surface enhances the performance of maintaining the posture of the reel even when it is horizontally placed (the reel is less likely to be tilted), the degree of parallelization with respect to the rotation-drive member of the cartridge drive unit is enhanced, and consequently, chucking failure can be prevented.

Furthermore, the effect of preventing core axis misalignment in the vertically placed state can be further enhanced by providing the rubber layer, which has great contacting and sliding resistances, on the receiving surface, or by enlarging the receiving surface and also increasing the urging force of the urging member.

In accordance with the present invention, there is provided a third magnetic tape cartridge comprising:

- a cartridge case in which a single reel with magnetic tape wound on an outer periphery of a reel drum is rotatably housed;
- a circular opening formed in a bottom surface of the cartridge case so that a bottom surface of the reel drum can be chucked by rotation-drive means of a cartridge drive unit;
- a receiving surface, formed in the circumference of the opening, against which the reel is pressed in an axial direction of the reel with urging means during non-use; and
- a regulation means, provided between the receiving surface and a reel surface that is pushed against the receiving surface, that engages in a convex-concave manner for regulating radial movement of the reel during non-use.

In the third magnetic tape cartridge, the aforementioned regulation means is constructed of an annular groove formed concentrically in the receiving surface of the cartridge case, and an annular ridge formed in the reel surface so that it can be fitted in the annular groove. The regulation means may also be constructed of a first inclined surface continuous to the receiving surface of the cartridge case, and a second inclined surface formed in the reel so as to be opposed to the first inclined surface.

According to the third magnetic tape cartridge of the present invention, a regulation means for regulating radial movement of the reel during non-use is provided between the receiving surface of the cartridge case and a reel surface that is pushed against the receiving surface. Therefore, even in the case where the magnetic tape cartridge is vertically loaded into the cartridge drive unit, the radial movement of the reel by the weight of magnetic tape is regulated by the regulation means and therefore the amount of the core axis misalignment with respect to the rotation-drive member of the cartridge drive unit is reduced to an extremely slight value. Thus, chucking failure due to core axis misalignment is prevented.

In accordance with the present invention, there is provided a fourth magnetic tape cartridge comprising:

- a cartridge case in which a single reel with magnetic tape wound on an outer periphery of a reel drum is rotatably housed;
- an annular reel gear, provided in a bottom surface of the reel drum, which is meshed by an annular drive gear of a rotation-drive member of a cartridge drive unit in an axial direction of the annular drive gear so that the reel is rotated; and
- a guide means, provided in two opposed surfaces between the rotation-drive member and the bottom surface of the reel drum, for guiding the reel drum and the rotation-drive member so that when a chucking operation is performed, the center axis of the reel drum is aligned with that of the rotation-drive member.

In the fourth magnetic tape cartridge, the guide means is constructed of a protrusion, formed in one of the two opposed surfaces (the bottom surface of the reel drum and the rotation drive member), which has a conical surface at its upper end portion, and a center bore, formed coaxially with the conical protrusion in the other of the two opposed surfaces, which has an inner peripheral surface into which the conical surface of the protrusion is fitted.

According to the fourth magnetic tape cartridge of the present invention, a guide means is provided in two opposed surfaces between the rotation-drive member and the bottom surface of the reel drum, and guides the reel drum and the rotation-drive member so that when a chucking operation is performed, the center axis of the reel drum is aligned with that of the rotation-drive member. Therefore, even when the magnetic tape cartridge is vertically loaded into a cartridge drive unit and core axis misalignment of the reel drum occurs, the core axis misalignment of the reel is adjusted during chucking, and consequently, chucking failure is prevented.

BRIEF DESCRIPTION OF THE DRAWINGS

The present invention will be described in further detail with reference to the accompanying drawings wherein:

FIG. 1 is a front sectional view of a magnetic tape cartridge of a first embodiment of the present invention in the non-operative state;

FIG. 11 is a sectional view of the essential parts of the magnetic tape cartridge of FIG. 10 in the operative state;

FIG. 14 is a part-enlarged sectional view showing a modification of the magnetic tape cartridge of the third embodiment, the reel in the non-operative state being held at its center position;

FIG. 15 is a partially-enlarged sectional view showing the state in which the reel is shifted from the center position;

DESCRIPTION OF THE PREFERRED EMBODIMENTS

Figure 2:
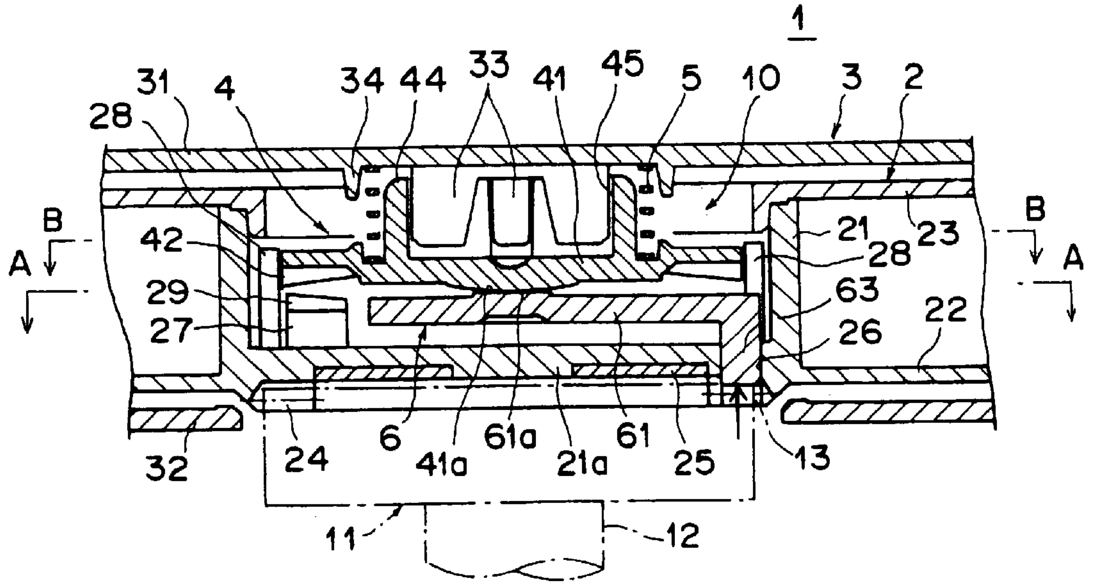
FIG. 2 is a sectional view of the essential part of the magnetic tape cartridge of FIG. 1 in the operative state.

Preferred embodiments of the present invention will hereinafter be described in detail with reference to the drawings.

In FIG. 1, the cartridge case 3 of a magnetic tape cartridge 1 is formed by fastening an upper case 31 and a lower case 32 together with small screws, etc. The lower case 32 is provided at a center portion thereof with an opening 32*a*. A single reel 2 with magnetic tape (not shown) wound thereon is rotatably housed within the cartridge case 3. Furthermore, a reel locking mechanism 10 is housed within the center bore of the reel 2, and locks the reel 2 when not being used and restrains rotation of the reel 2.

The reel 2 consists of a bottomed cylindrical reel drum 21 and upper and lower flanges 22 and 23. Magnetic tape is wound on the outer periphery of the reel drum 21, and the upper and lower flanges 22 and 23 are respectively projected in discoid form in the radial direction from the upper and lower ends of the outer periphery of this reel drum 21. The reel drum 21 and the lower flange 22 are integrally formed from synthetic resin material. The upper flange 23, consisting likewise of synthetic resin material, is fitted on the upper end of the reel drum 21 and is fixedly attached to the reel drum 21, for example, by ultrasonic welding.

The reel drum 21 is closed at a lower portion thereof by a bottom wall 21*a*. The radially outer portion of the bottom surface of the bottom wall 21*a* has an annular reel gear 24 that meshes with the driving gear 13 of rotation-drive member 11 provided in a cartridge drive unit (not shown). A reel plate 25 for magnetic suction is formed from an annular metal plate and is attached inside the reel gear 24. The reel gear 24 and reel plate 25 of the reel 2 are disposed to face the opening 32*a* formed in the bottom surface of the cartridge case 3.

The rotation-drive member 11 of the cartridge drive unit, on the other hand, is equipped with the aforementioned annular driving gear 13 and a driving magnet (not shown), which are provided on the top surface of a disc portion 15 mounted on the top end of a rotating shaft 12.

In the chucking operation of the rotation-drive member 11, the magnetic tape cartridge 1 loaded into a bucket (not shown) of the cartridge drive unit is first lowered toward the rotating shaft 12. Then, the driving gear 13 meshes with the reel gear 24, and the reel plate 25 inside the reel gear 24 is attracted by the driving magnet provided inside the driving gear 13, whereby the meshed state between the driving gear 13 and the reel gear 24 is held.

Next, a description will be given of the construction of the reel locking mechanism 10. This reel locking mechanism 10 is equipped with a locking member 4 axially movable between a locking position and an unlocking position; an urging member (e.g., a coil spring) 5 for urging the locking member 4 in a locking direction; and an unlocking member 6 for moving the locking member 4 in an unlocking direction.

Figure 3:
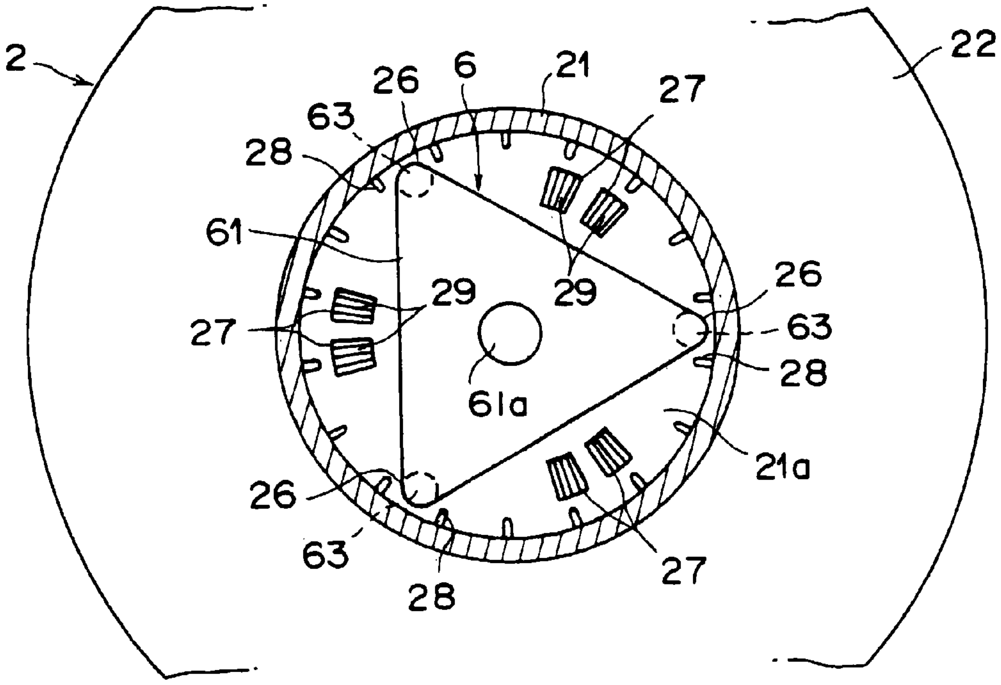
FIG. 3 is a sectional plan view taken substantially along line A—A of FIG. 2.

3 (three) through holes 26 vertically penetrating the reel gear 24 are disposed in the bottom wall 21*a* of the reel 2 at regular intervals along the circumference of a circle (see FIG. 3). Furthermore, three pairs of stopper protrusions (i.e., 6 (six) stopper protrusions) 27 are erected in the top surface of the bottom wall 21*a* at regular intervals on a circle at positions different in phase from the through holes 26. The tip of each stopper protrusion 27 is formed into a locking tooth portion 29. Note that three or more through holes 26 may be disposed. Also, three or more pairs of stopper protrusions 27 maybe disposed. Furthermore, the locking tooth portion 29 of the top end of the stopper protrusion 27 may be formed into the shape of a single gear tooth.

The locking member 4, formed from synthetic resin material, has a disc portion 41 within the reel drum 21 of the reel 2, the disc portion 41 being disposed to face the bottom wall 21*a* of the reel 2. The radially outer portion of the bottom surface of the disc portion 41 is formed into an annular locking tooth portion 42, which is meshable with the locking tooth portions 29 of the stopper protrusions 27. In addition, the center portion of the bottom surface of the disc portion 41 is projected downward and formed into a slide portion 41*a*. The slide portion 41*a* is engageable with the slide portion 61*a* of the top surface of the main body portion 61 of the unlocking member 6 to be described later by the urging force of the urging member 5.

The locking tooth portions 42, 29 are each formed into the shape of a cone so that the tooth depth becomes higher at the radially outer portion than at the radially inner portion, so that the radially outer portions first mesh with each other.

Figure 4:
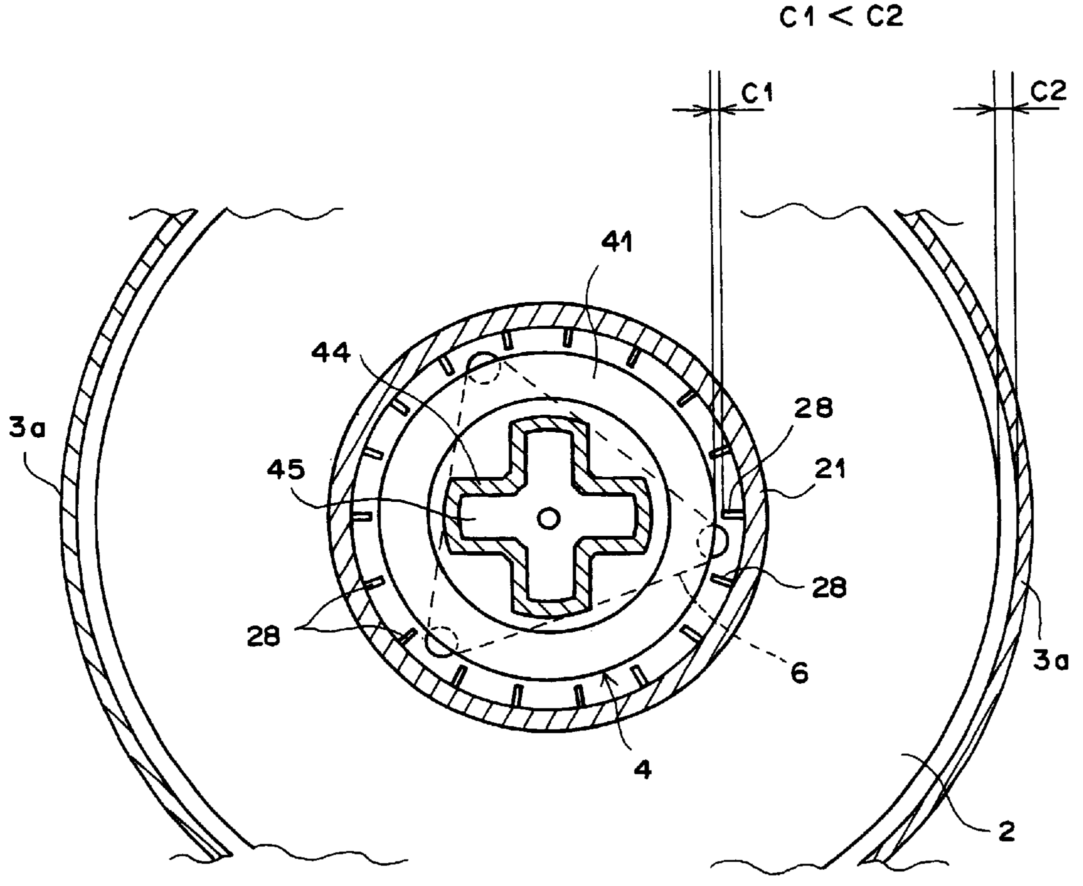
FIG. 4 is an enlarged sectional view taken substantially along line B—B of FIG. 2.

A protruding portion 44 extends upward from the top surface of the disc portion 41 of the locking member 4. The protruding portion 44 is provided with a stopper groove 45 in the form of a cross, which extends vertically (see FIG. 4). On the other hand, a supporting portion (swivel stopping protrusion) 33 that is inserted into the stopper groove 45 is erected in the inside surface of the upper case 31 of the cartridge case 3. If the stopper groove 45 and the supporting portion 33 engage with each other, the locking member 4 can move in an up-and-down direction without rotating. The clearance between the stopper groove 45 of the locking member 4 and the supporting portion 33 of the upper case 31 is set extremely small.

The aforementioned urging member 5, consisting of a coil spring, is interposed between the top surface, outside the protruding portion 44, of the disc portion 41 of the locking member 4, and the spring receiver 34, outside the supporting portion 33, of the upper case 3. With the urging member 5 thus interposed, the locking member 4 is urged downward in the direction where the locking tooth portion 42 of the locking member 4 engages with the locking tooth portions 29 of the reel 2.

The unlocking member 6 is interposed between the locking member 4 and the bottom wall 21*a* of the reel drum 21 so that it is movable up and down. For this reason, three cylindrical leg portions 63 extending downward are provided on the bottom surface of a main body portion 61 in the form of a generally triangular plate that corresponds to the vertexes of the main body portion 61. The leg portions 63 are inserted into the through holes 26 formed in the bottom wall 21 of the reel 2 so that they are movable. The lower ends of the leg portions 63 are located to face the tooth portion of the reel gear 24 of the bottom surface of the reel 2. With the leg portions 63 inserted into the through holes 26, each pair of stopper protrusions 27 is located between two adjacent leg portions 63 and outside the main body portion 61 of the unlocking member 6. Note that the leg portion 63 may be formed into the shape of a square pillar, an elliptical cylinder, etc.

When the unlocking member 6 is at the lower most position (see FIG. 1), the lower ends of the leg portions 63 of the unlocking member 6 project from the bottom surface of the reel gear 24. As the driving gear 13 is meshed with the reel gear 24 by the chucking operation of the rotation-drive member 11 of the cartridge drive unit (not shown), the unlocking member 6 is pushed upward by a predetermined quantity of stroke (see FIG. 2). At the same time, the reel 2 is slightly pushed upward by the driving gear 13 and is separated from the lower case 2. The unlocking member 6 is rotated integrally with the reel 2 by the fit of the leg portions 63 into the through holes 26.

The reel 2 has a great number of ribs 28 extending in the axial direction of the reel 2 at the inner peripheral surface thereof, the ribs 28 being formed at predetermined intervals in the circumferential direction of the reel 2. Some of the ribs 28 function as guide ribs that guide the unlocking member 6 in the direction of insertion when inserting the leg portions 63 of the unlocking member 6 into the through holes 26, and the remaining ribs function as reinforcement ribs for the reel drum 21 (see FIGS. 3 and 4). As clearly shown in FIG. 4, the outer ends of the ribs 28 are on a circle concentric with the reel drum 21 and are opposed to the outer peripheral surface of the disc portion 41 of the locking member 4 with radial clearance C1 (which is an average value).

The outer peripheral surfaces of the upper and lower flanges 22, 23 of the reel 2, on the other hand, are opposed to the inner periphery of the cartridge case 3 (exactly speaking, a circular arc rib 3*a* formed in the cartridge case 3 along the outer peripheral surfaces of the upper and lower flanges 22, 23 of the reel 2) with radial clearance C2 (which is an average value). The values of the clearances C1 and C2 are set so that they satisfy a relationship of C1<C2.

More specifically, in the case of a magnetic tape cartridge with a reel of about 98 mm in diameter, the clearance C1 is about 0.3 to 0.7 mm and the clearance C2 about 1 mm. And the clearance between the stopper groove 45 of the locking member 4 and the supporting portion of the upper case 31 is slightly smaller than the clearance C1.

Next, the operation of the reel locking mechanism 10 will be described. When the magnetic tape cartridge 1 shown in FIG. 1 is in a non-operative state such as an archived state, etc., the locking member 4, the unlocking member 6, and the reel 2 have been moved to the side of the lower case 32 of the cartridge case 3 by the urging force of the urging member 5. In this state, the center opening 32*a* in the lower case 32 is closed by the reel 12. The unlocking member 6 is at the lower most position where the bottom surface thereof abuts the top surface of the bottom wall 21*a* of the reel drum 21. The lower ends of the leg portions 63 of the unlocking member 6 project from the tooth edge of the reel gear 24. Similarly, the locking member 4 abutting the top surface of the unlocking member 6 is at its lowered position. The locking tooth portion 42 of the locking member 4 meshes with the locking tooth portions 29 of the stopper protrusions 27. Thus, the locking member 4 is in a locked state of restraining rotation of the reel 2 when the reel 2 is not being used and preventing magnetic tape from being pulled out of the magnetic tape cartridge 1.

On the other hand, in the operative state of FIG. 2 in which the magnetic tape cartridge 1 is loaded into the cartridge drive unit, the disc portion 15 of the rotating shaft 12 of the rotation-drive member 11 is moved toward the bottom surface of the reel 2. The driving gear 13 meshes with the reel gear 24 and moves and holds the reel 2 slightly upward. Then, the tooth edges of the driving gear 13 abut the lower ends of the leg portions 63 of the unlocking member 6 and push them up. As a result, the unlocking member 6 moves upward against the urging force of the urging member 5, and the locking member 4, along with this unlocking member 6, also moves in the upward unlocking direction. This unlocks the engagement between the locking tooth portion 42 and the locking tooth portion 29, whereby the reel 2 becomes free to rotate. And the magnetic tape is loaded or unloaded by the cartridge drive unit.

In the embodiment shown in FIGS. 1 to 4, as evident in the foregoing description, the radial clearance C1 between the outer peripheral surface of the disc portion 41 of the locking member 4 and the outer ends of the ribs 28 formed in the inner peripheral surface of the reel drum 21, is narrower than the radial clearance C2 between the outer peripheral surfaces of the upper and lower flanges 22, 23 of the reel 2 and the circular arc rib 3*a* of the cartridge case 3. Therefore, even if the reel 2 is caused to move downward by the weight of the magnetic tape when the magnetic tape cartridge 1 is vertically loaded into the cartridge drive unit, the outer ends of the ribs 28 abut the outer peripheral surface of the disc portion 41 of the locking member 4 immediately and regulate downward movement of the reel 2. As a result, the amount of the core axis misalignment of the reel drum 21 with respect to the rotation-drive member 11 of the cartridge drive unit is held down to a slight value. Thus, chucking failure due to core axis misalignment is prevented.

Figure 5:
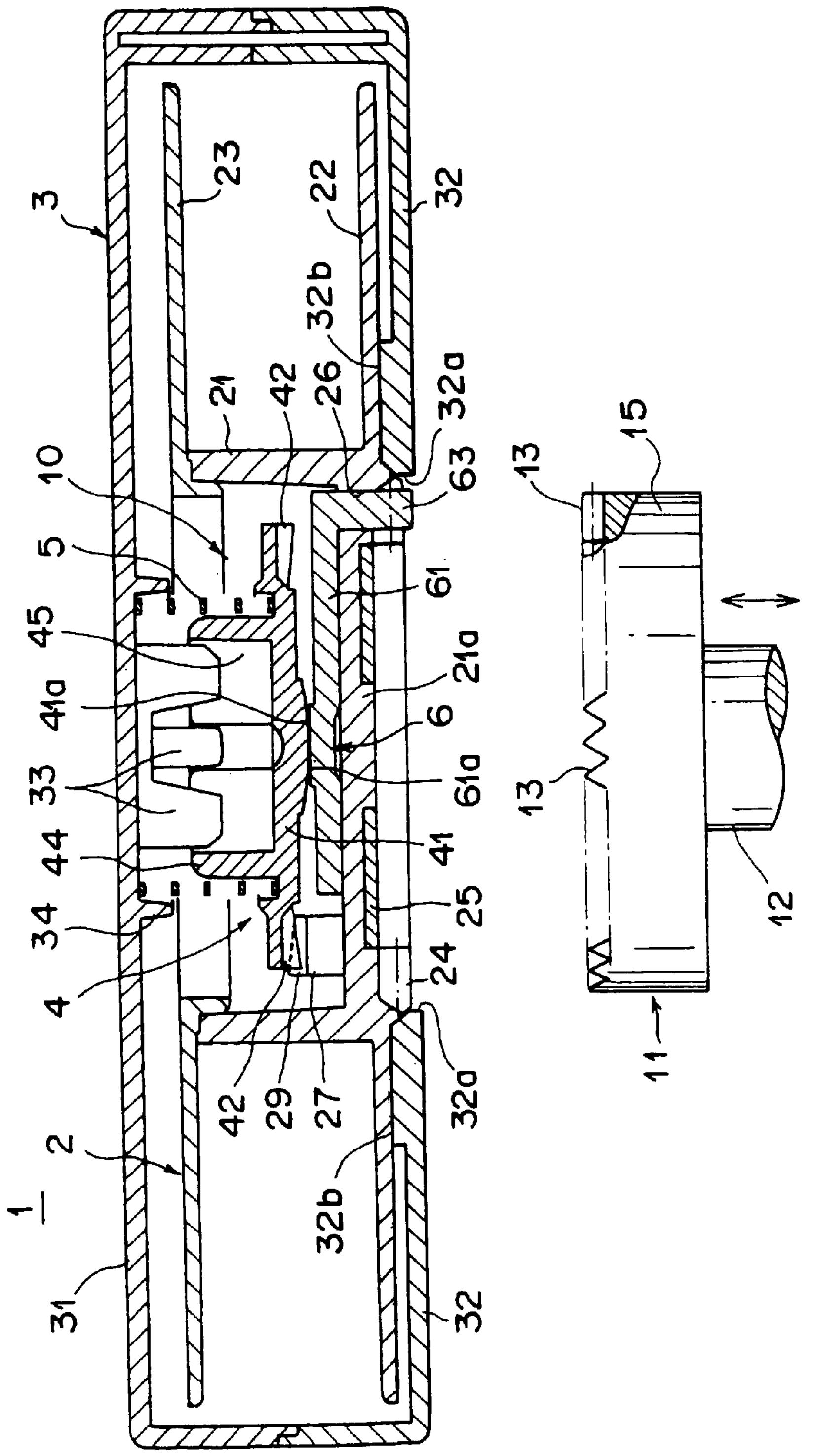
FIG. 5 is a front sectional view of a magnetic tape cartridge of a second embodiment of the present invention in the non-operative state.
Figure 6:
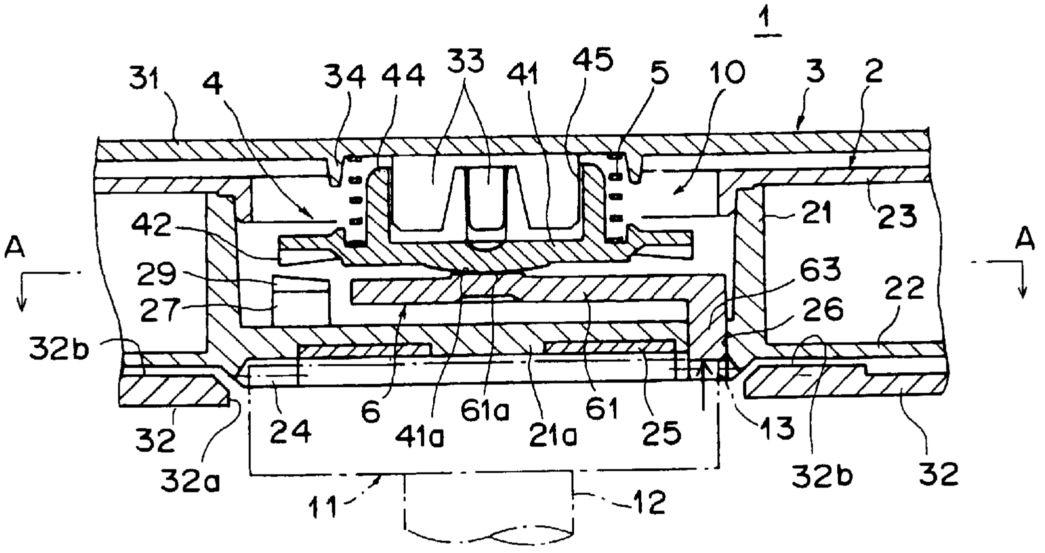
FIG. 6 is a sectional view of the essential parts of the magnetic tape cartridge of FIG. 5 in the operative state.

FIGS. 5 and 6 are sectional views showing a magnetic tape cartridge constructed according to a second embodiment of the present invention, and correspond to FIGS. 1 and 2, respectively.

In FIGS. 5 and 6, the same reference numerals are assigned to parts corresponding to those shown in FIGS. 1 and 2 to avoid redundancy. In the second embodiment, as clearly shown in FIGS. 7 and 8 which show the essential parts of FIGS. 5 and 6, the circumference of an opening 32*a* formed in the central portion of the lower case 32 of a cartridge case 3 is made thicker in concentric form over a predetermined range in the radial direction of a reel 2. The flat top surface of the thickened portion constitutes a receiving surface 32*a*, which abuts the bottom surface 22*a* of the lower flange 22 of the reel 2 in the axial direction of the reel 2 during non-use shown in FIGS. 5 and 7. A reel locking mechanism 10 is equipped with an urging member 5 for urging a locking member 4 in a locking direction. During non-use, the urging force of the urging member 5 is exerted on the reel 2 through the locking member 4 and an unlocking member 6, whereby the bottom surface 22*a* of the lower flange 22 of the reel 2 is pressed against the receiving surface 32*b*.

Figure 9:
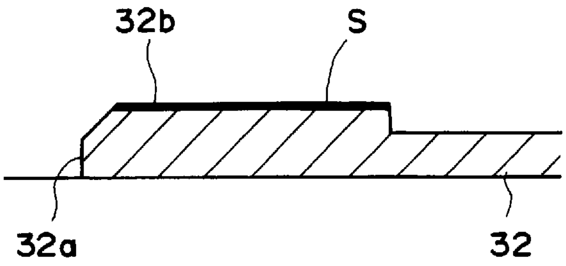
FIG. 9 is an enlarged sectional view showing the state in which a layer of material having great contacting and sliding resistances is provided on the receiving surface of the cartridge case.

In this case, a layer S of rubber having great contacting and sliding resistances may be provided on the receiving surface 32*b* by attachment of a sheet or a dichroic injection molding method, as shown in FIG. 9.

Figure 7:
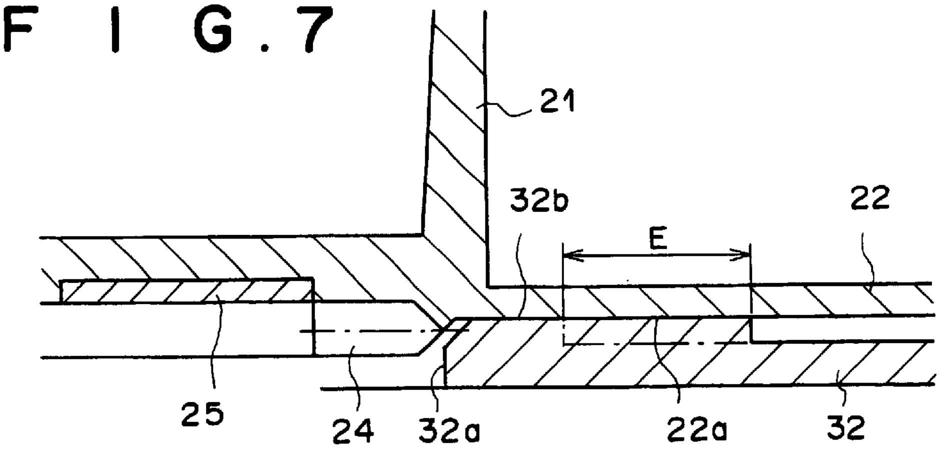
FIG. 7 is an enlarged view showing the essential parts of the magnetic tape cartridge of FIG. 5.
Figure 8:
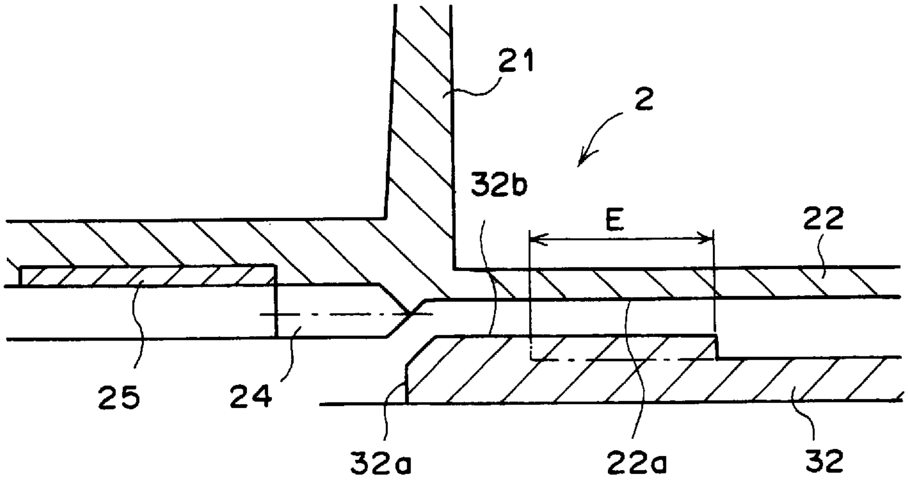
FIG. 8 is an enlarged view showing the essential parts of the magnetic tape cartridge of FIG. 6.

In conventional magnetic tape cartridges, the receiving surface 32*b* is limited to a narrow region in the circumference of the opening 32*a*. However, in this embodiment, as shown in FIGS. 7 and 8, an enlarged annular region E in the radial direction of the reel 2 is provided outside the region corresponding to the conventional receiving surface, whereby the area of the receiving surface 32 is considerably increased. Thus, the sliding resistance between the receiving surface 32*b* and the reel surface 22*a* is drastically increased. Therefore, even in the case where the magnetic tape cartridge 1 is vertically set, the reel 2 can be prevented from being moved downward by the weight of the reel 2, and consequently, chucking failure due to the core axis misalignment 11 of the reel drum 21 with respect to the rotation-drive member of the cartridge drive unit is prevented.

In addition, since enlargement of the receiving surface 32*b* enhances the performance of maintaining the posture of the reel 2 even when it is horizontally placed (the reel 2 is less likely to be tilted), the degree of parallelization with respect to the rotation-drive member 11 of the cartridge drive unit is enhanced, and consequently, chucking failure can be prevented.

Furthermore, the effect of preventing core axis misalignment can be further enhanced by providing the rubber layer S, which has great contacting and sliding resistances, on the receiving surface 32, or by enlarging the receiving surface 32*b* and also increasing the urging force of the urging member 5.

Figure 10:
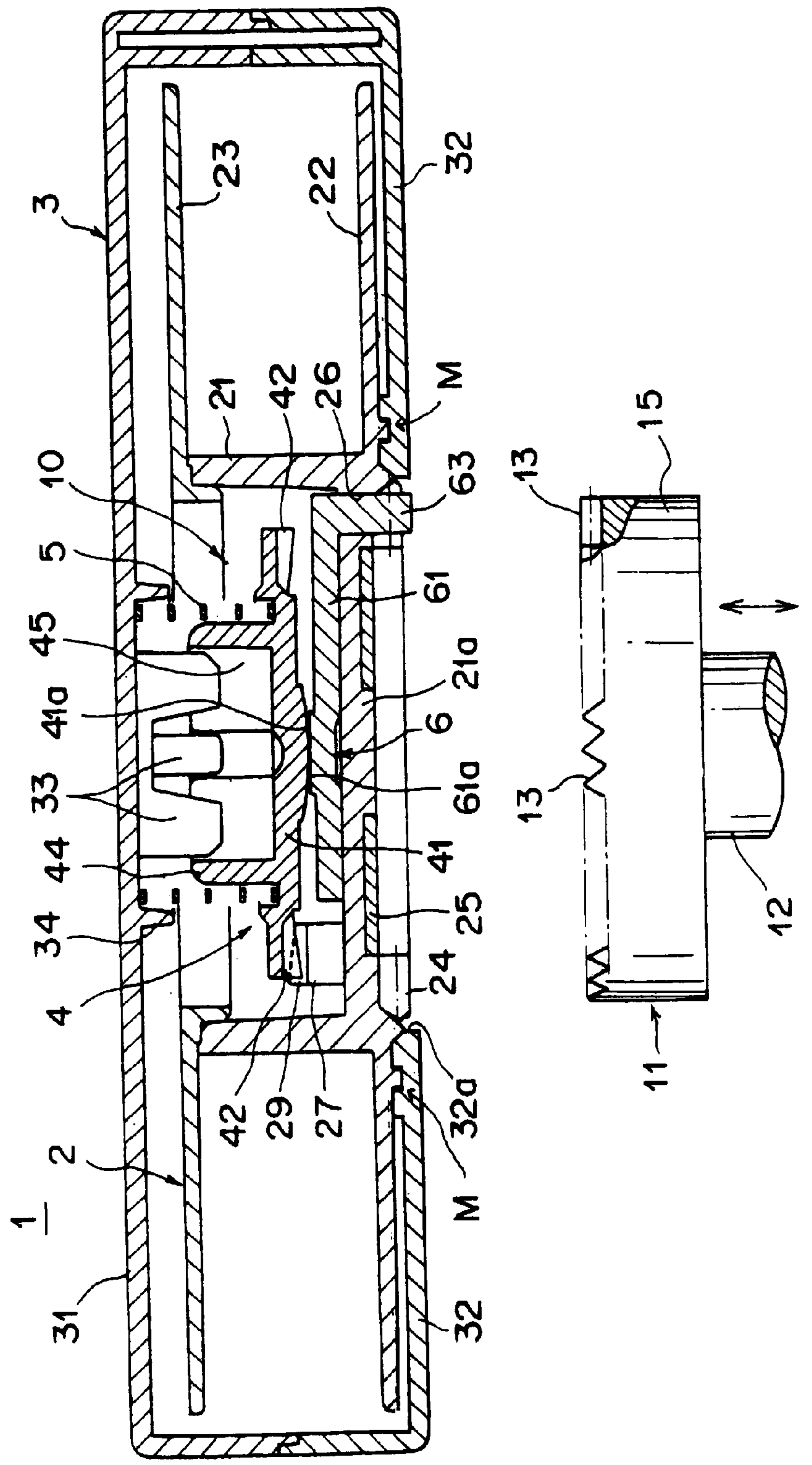
FIG. 10 is a front sectional view of a magnetic tape cartridge of a third embodiment of the present invention in the non-operative state.

FIGS. 10 and 11 are sectional views showing a magnetic tape cartridge constructed according to a third embodiment of the present invention, and correspond to FIGS. 5 and 6, respectively.

In FIGS. 10 and 11, the same reference numerals are assigned to parts corresponding to those shown in FIGS. 5 and 6 to avoid redundancy. This embodiment is equipped with regulation means M for regulating radial movement of a reel 2 during non-use.

Figure 12:
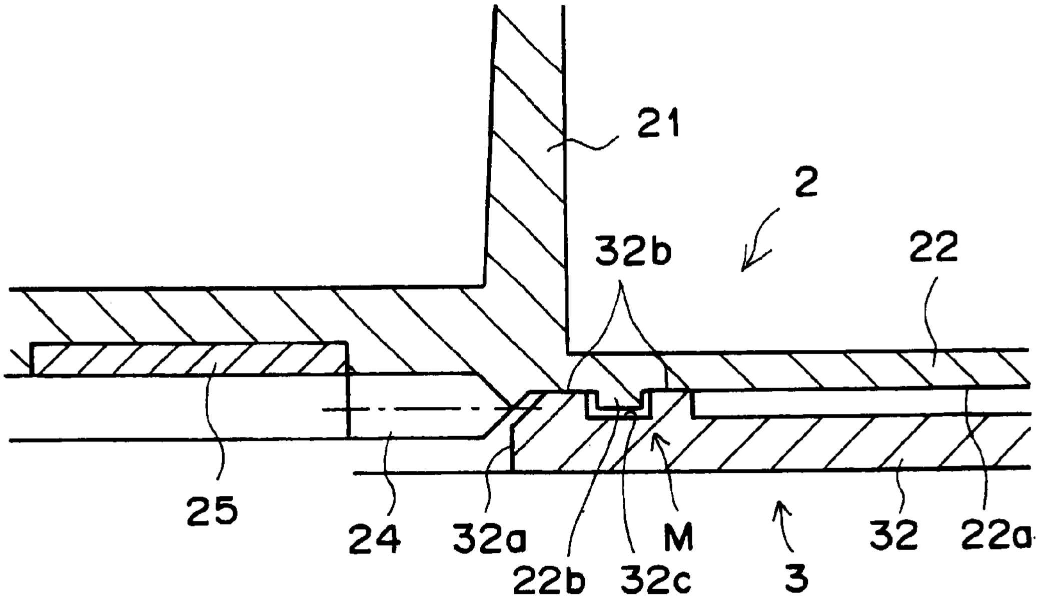
FIG. 12 is an enlarged view showing the essential parts of the magnetic tape cartridge of FIG. 10.
Figure 13:
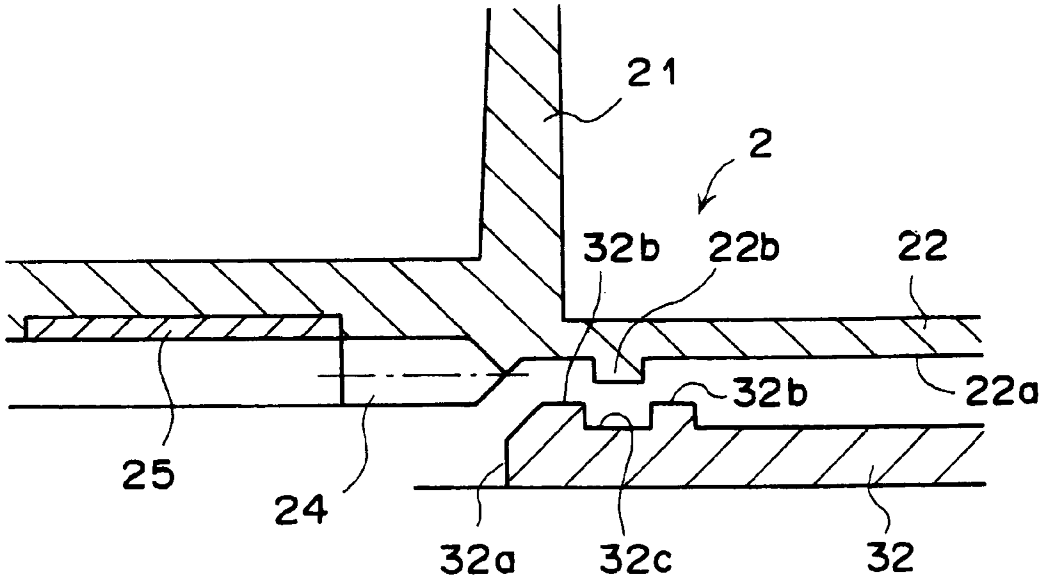
FIG. 13 is an enlarged view showing the essential parts of the magnetic tape cartridge of FIG. 11.

As clearly shown in FIGS. 12 and 13 which show the essential parts of FIGS. 10 and 11, the circumference of an opening 32*a* formed in the central portion of the lower case 32 of a cartridge case 3 is made thicker. The flat top surface of the thickened portion constitutes a receiving surface 32*b*, which abuts the bottom surface 22*a* of the lower flange 22 of the reel 2 in the axial direction of the reel 2 during non-use shown in FIGS. 10 and 12. A reel locking mechanism 10 is equipped with an urging member 5 for urging a locking member 41 in a locking direction. During non-use, the urging force of the urging member 5 is exerted on the reel 2 through the locking member 41 and an unlocking member 6, whereby the reel 2 is pressed against the receiving surface 32*b*.

The receiving surface 32*b* has an annular groove 32*c*, which is formed concentrically with the reel 2. The bottom surface 22*a* of the lower flange 22 of the reel 2 has an annular ridge 22*b*, which is fitted in the groove 32*c* during non-use. Therefore, even if the reel 2 is caused to move downward by the weight of magnetic tape when the magnetic tape cartridge 1 is vertically loaded into the cartridge drive unit, radial movement of the reel 2 will be regulated by the regulation means M.

During use, as shown in FIGS. 11 and 13, the driving gear 13 of the rotation-drive member 11 meshes with the reel gear 24 and pushes the reel 2 upward, so that the ridge 22*b* of the lower flange 22 is separated from the groove 32*c* of the receiving surface 32*b*. Thus, there is no possibility that rotation of the reel 2 will be interfered with by the regulation means M.

In this embodiment, the groove 32*c* of the receiving surface 32*b* and the ridge 22*b* of the bottom surface 22*a* of the reel 2, which constitute the regulation means M, are engaged with each other during non-use. Therefore, even in the case where the magnetic tape cartridge 1 is vertically loaded into the cartridge drive unit, radial movement of the reel 2 is regulated and therefore the amount of the core axis misalignment with respect to the rotation-drive member 11 of the cartridge drive unit is reduced to an extremely slight value. Thus, chucking failure due to core axis misalignment is prevented.

In the aforementioned embodiment, the groove 32*c* of the receiving surface 32*b* and the ridge 22*b* of the bottom surface 22*a* of the reel 2, which constitute the regulation means M, have engaging surfaces parallel to the axis of the reel 2. However, the engaging surfaces may be inclined surfaces.

That is, FIGS. 14 and 15 show an embodiment in which the engaging surfaces are inclined surfaces. FIG. 14 shows the case of the reel 2 being held at its center position, while FIG. 15 shows the case of the reel 2 being shifted from the center position of the reel 2.

The upper end portion of the wall surface of the opening 32*a* of the bottom surface of the cartridge case 3 is formed into an inclined surface 32*d* continuous to the receiving surface 32*b*, while the reel 2 has an inclined surface 22*c* that is opposed to the inclined surface 32*d*. When the reel 2 is held at the center position thereof, as shown in FIG. 14, there is predetermined clearance between these inclined surfaces 32*d*, 22*c*. However, if the magnetic tape cartridge 1 is vertically placed and the reel 2 is moved slightly from the center position, the inclined surfaces 32*d*, 22*c* are pushed against each other, as shown in FIG. 15. As a result, further movement of the reel 2 is prevented and the core axis misalignment of the reel drum 21 with the rotation-drive member 11 of the cartridge drive unit is prevented.

Figure 16:
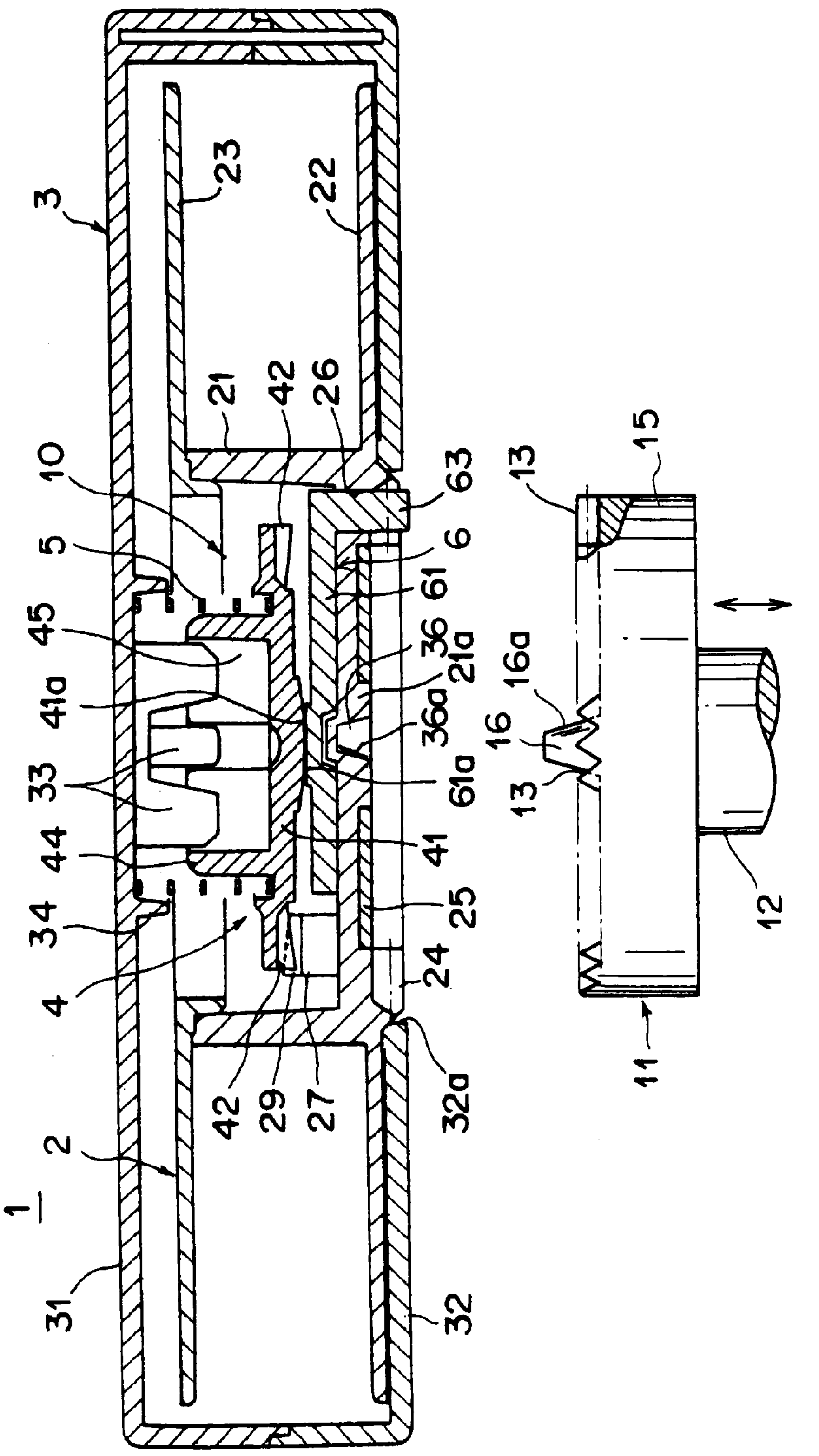
FIG. 16 is a front sectional view of a magnetic tape cartridge of a fourth embodiment of the present invention in the non-operative state.
Figure 17:
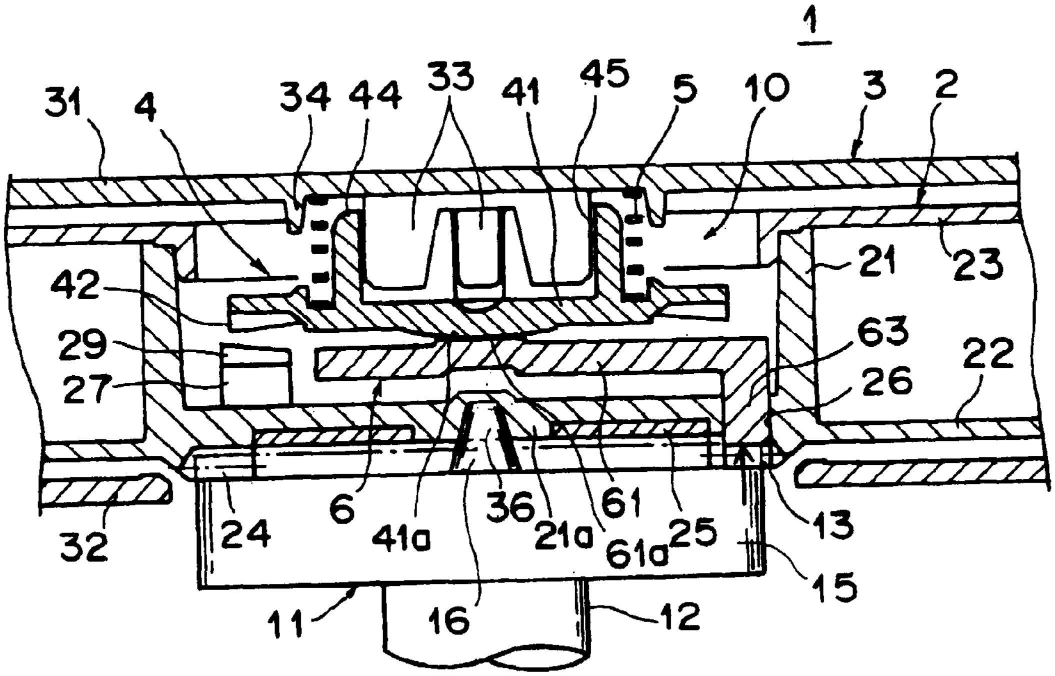
FIG. 17 is a sectional view of the essential parts of the magnetic tape cartridge of FIG. 16 in the operative state.

FIGS. 16 and 17 are sectional views showing a magnetic tape cartridge constructed according to a fourth embodiment of the present invention, and correspond to FIGS. 1 and 2, respectively.

In this embodiment, a protrusion 16 with a conical surface 16*a* at its upper end portion is erected at the center of the top surface of a disc portion provided in the rotation-drive member 11 of a cartridge drive unit. On the other hand, the bottom wall 21*a* of a reel drum 21 has a center bore 36, coaxial with the protrusion 16, which is equipped with an inner peripheral surface 36*a* into which the conical surface 16*a* of the protrusion 16 is fitted. The protrusion 16 and the center bore 36 constitute guide means, which is used to guide the reel drum 21 and the rotation-drive member 11 so that when a chucking operation is performed on the reel drum 21 by the rotation-drive member 11, the center axis of the reel drum 21 is aligned with that of the rotation-drive member 11.

In the chucking operation of the rotation-drive member 11 in the case where the magnetic tape cartridge 1 is horizontally loaded into a bucket (not shown) on the side of the cartridge drive unit, the magnetic tape cartridge is first lowered toward a rotating shaft 12. Then, the protrusion 16 of the rotation-drive member 11, equipped with the conical surface 16*a*, is fitted into the center bore 36 of the bottom wall 21*a* of the reel drum 21. Next, the driving gear 13 meshes with the reel gear 24, and the reel gear 24 is attracted by a magnet (not shown) provided inside the driving gear 13, whereby the meshed state between the driving gear 13 and the reel gear 24 is held.

In the case of the magnetic tape cartridge 1 being vertically loaded into the cartridge unit, on the other hand, there is a possibility that the reel 2 will be moved downward by the weight of magnetic tape and therefore the center axis of the reel drum 21 will be shifted from that of the rotation-drive member 11. However, the protrusion 16 of the rotation-drive member 11, equipped with the conical surface 16*a* that relatively approaches the magnetic tape cartridge 1 in the horizontal direction, is fitted into the center bore 36 of the bottom wall 21*a* of the reel drum 21 prior to chucking. This causes the reel drum 21 to move upward so that the center axis of the reel drum 21 is aligned with that of the rotation-drive member 11. As a result, the core axis misalignment between the reel drum 21 and the rotation-drive member 11 is eliminated and there is no possibility that chucking failure will occur.

Although the center bore 36 is provided on the reel drum 21 and the protrusion 16 on the rotation-drive means, the center bore 36 may be provided on the side of the rotation-drive member 11 and the protrusion 16 on the reel drum 21.

Furthermore, while the present invention has been described with reference to the preferred embodiments thereof, the invention is not to be limited to the details given herein, but may be modified within the scope of the invention hereinafter claimed.

What is claimed is:

1. A magnetic tape cartridge comprising:

a cartridge case in which a single reel with magnetic tape wound on the outer periphery of a reel drum rotatably housed; and a locking member, provided within said reel drum so that it is movable between a locking position and an unlocking position in an axial direction of said reel, for locking said reel to restrain rotation of said reel during periods of non-use;

wherein a first radial clearance between said locking member and said reel drum is set smaller than a second radial clearance between said reel and said cartridge case;

wherein, during a movement of the reel within the cartridge case, the locking member is adapted to contact the reel drum and prevent contact between the reel and the cartridge case, and wherein said reel drum has reinforcement ribs on the inner peripheral surface thereof; and said first radial clearance is the clearance between the outer peripheral surface of said locking member and the outer ends of said ribs.

2. A magnetic tape cartridge comprising:

a cartridge case in which a single reel with magnetic tape wound on the outer periphery of a reel drum rotatably housed; and a locking member, provided within said reel drum so that it is movable between a locking position and an unlocking position in an axial direction of said reel, for locking said reel to restrain rotation of said reel during periods of non-use;

wherein a first radial clearance between said locking member and said reel drum is set smaller than a second radial clearance between said reel and said cartridge case; and wherein said cartridge case is equipped with a circular arc rib along the outer periphery of said reel; and said second radial clearance is the clearance between said outer periphery of said reel and the inner peripheral surface of said circular arc rib.

3. The magnetic tape cartridge as set forth in claim 2, wherein said reel drum has reinforcement ribs on the inner peripheral surface thereof; and said first radial clearance is the clearance between an outer peripheral surface of said locking member and outer ends of said ribs.

4. A magnetic tape cartridge comprising:

a cartridge case in which a single reel with magnetic tape wound on the outer periphery of a reel drum is rotatably housed;

an annular reel gear, provided in the bottom surface of said reel drum, which is meshed by an annular drive gear of a rotation-drive member of a cartridge drive unit in an axial direction of said annular drive gear so that said reel is rotated; and a guide means, provided in opposed surfaces of said rotation-drive member and said reel drum, for guiding and aligning said reel drum and said rotation-drive member so that when a chucking operation is performed, a center axis of said reel drum is aligned with that of said rotation-drive member.

5. A magnetic tape cartridge comprising:

a cartridge case in which a single reel with magnetic tape wound on the outer periphery of a reel drum is rotatably housed;

an annular reel gear, provided in the bottom surface of said reel drum, which is meshed by an annular drive gear of a rotation-drive member of a cartridge drive unit in an axial direction of said annular drive gear so that said reel is rotated; and a guide means, provided in the two opposed surfaces between said rotation-drive member and the bottom surface of said reel drum, for guiding and aligning said reel drum and said rotation-drive member so that when a chucking operation is performed, a center axis of said reel drum is aligned with that of said rotation-drive member;

wherein said guide means is constructed of a protrusion, formed in one of said two opposed surfaces, which has a conical surface at its upper end portion, and a center bore, formed coaxially with said protrusion in the other of said two opposed surfaces, which has a corresponding inner peripheral surface into which the conical surface of said protrusion is fitted.

6. A magnetic tape cartridge comprising:

a cartridge case in which a single reel with magnetic tape wound on the outer periphery of a reel drum is rotatably housed;

a locking member, provided within said reel drum so that it is movable between a locking position and an unlocking position in an axial direction of said reel, for locking said reel to restrain rotation of said reel during periods of non-use;

a circular opening formed in the bottom surface of said cartridge case so that the bottom surface of said reel drum can be chucked by rotation-drive means of a cartridge drive unit; and a receiving surface, formed in the circumference of said opening, against which said reel is pressed in an axial direction of said reel with urging means during periods of non-use, wherein a first radial clearance between said locking member and said reel drum is set smaller than a second radial clearance between said reel and said cartridge case, wherein, during a movement of the reel within the cartridge case, the locking member is adapted to contact the reel drum and prevent contact between the reel and the cartridge case, and wherein said receiving surface is enlarged in a radial direction of said reel.

7. The magnetic tape cartridge as set forth in claim 6, wherein a layer of material having great contacting and sliding resistance is provided on said receiving surface.

8. A magnetic tape cartridge comprising:

a cartridge case in which a single reel with magnetic tape wound on the outer periphery of a reel drum is rotatably housed;

a locking member, provided within said reel drum so that it is movable between a locking position and an unlocking position in an axial direction of said reel, for locking said reel to restrain rotation of said reel during periods of non-use;

a circular opening formed in the bottom surface of said cartridge case so that the bottom surface of said reel drum can be chucked by rotation-drive means of a cartridge drive unit;

a receiving surface, formed in the circumference of said opening, against which said reel is pressed in an axial direction of said reel with urging means during periods of non-use; and a regulation means, provided between said receiving surface and a reel surface that is pushed against said receiving surface, for regulating radial movement of said reel during non-use, wherein a first radial clearance between said locking member and said reel drum is set smaller than a second radial clearance between said reel and said cartridge case;

wherein, during a movement of the reel within the cartridge case, the locking member is adapted to contact the reel drum and prevent contact between the reel and the cartridge case, and wherein said regulation means is constructed of an annular groove formed concentrically in the receiving surface of said cartridge case, and an annular ridge formed on said reel surface so that it can be fitted in said annular groove.

9. A magnetic tape cartridge comprising:

a cartridge case in which a single reel with magnetic tape wound on the outer periphery of a reel drum is rotatably housed;

a locking member, provided within said reel drum so that it is movable between a locking position and an unlocking position in an axial direction of said reel, for locking said reel to restrain rotation of said reel during periods of non-use;

a circular opening formed in the bottom surface of said cartridge case so that the bottom surface of said reel drum can be chucked by rotation-drive means of a cartridge drive unit;

a receiving surface, formed in the circumference of said opening, against which said reel is pressed in an axial direction of said reel with urging means during periods of non-use; and a regulation means, provided between said receiving surface and a reel surface that is pushed against said receiving surface, for regulating radial movement of said reel during non-use, wherein a first radial clearance between said locking member and said reel drum is set smaller than a second radial clearance between said reel and said cartridge case;

wherein, during a movement of the reel within the cartridge case, the locking member is adapted to contact the reel drum and prevent contact between the reel and the cartridge case, and wherein said regulation means is constructed of a first inclined surface continuous to the receiving surface of said cartridge case, and a second inclined surface formed on said reel so as to be opposed to said first inclined surface.

10. A magnetic tape cartridge comprising:

a cartridge case in which a single reel with magnetic tape wound on the outer periphery of a reel drum is rotatably housed;

a locking member, provided within said reel drum so that it is movable between a locking position and an unlocking position in an axial direction of said reel, for locking said reel to restrain rotation of said reel during periods of non-use;

an annular reel gear, provided in the bottom surface of said reel drum, which is meshed by an annular drive gear of a rotation-drive member of a cartridge drive unit in an axial direction of said annular drive gear so that said reel is rotated; and a guide means, provided in the two opposed surfaces between said rotation-drive member and the bottom surface of said reel drum, for guiding and aligning said reel drum and said rotation-drive member so that when a chucking operation is performed, a center axis of said reel drum is aligned with that of said rotation-drive member, wherein a first radial clearance between said locking member and said reel drum is set smaller than a second radial clearance between said reel and said cartridge case; and wherein said guide means is constructed of a protrusion, formed in one of said two opposed surfaces, which has a conical surface at its upper end portion, and a center bore, formed coaxially with said protrusion in the other of said two opposed surfaces, which has a corresponding inner peripheral surface into which the conical surface of said protrusion is fitted.

11. A magnetic tape cartridge comprising:

a cartridge case in which a single reel with magnetic tape wound on the outer periphery of a reel drum is rotatably housed;

a locking member, provided within said reel drum so that it is movable between a locking position and an unlocking position in an axial direction of said reel, for locking said reel to restrain rotation of said reel during periods of non-use;

a circular opening formed in the bottom surface of said cartridge case so that the bottom surface of said reel drum can be chucked by rotation-drive means of a cartridge drive unit; and a receiving surface, formed in the circumference of said opening, against which said reel is pressed in an axial direction of said reel with urging means during periods of non-use, wherein a first radial clearance between said locking member and said reel drum is set smaller than a second radial clearance between said reel and said cartridge case, and wherein said receiving surface is enlarged in a radial direction of said reel; and wherein said receiving surface is a stepped portion formed on the circumference of said opening.

* * * * *